United States Patent [19]
Ritter

[11] 3,914,516
[45] Oct. 21, 1975

[54] SUN PROTECTION GLASS
[75] Inventor: Elmar Ritter, Vaduz, Liechtenstein
[73] Assignee: Balzers Patent und Beteiligungs AG, Liechtenstein
[22] Filed: Oct. 19, 1973
[21] Appl. No.: 408,112

[30] Foreign Application Priority Data
Nov. 28, 1972 Switzerland............... 017352/72

[52] U.S. Cl. .................. 428/432; 252/300; 350/1; 350/164; 350/311; 427/166; 427/248; 427/250; 427/255; 428/433; 428/457; 428/539
[51] Int. Cl.² ................... G02B 5/22; B32B 17/06
[58] Field of Search .......... 117/124 B, 124 C, 33.3; 252/300; 350/311, 1

[56] References Cited
UNITED STATES PATENTS
3,010,850   11/1961   Colbert.......................... 117/107 X
FOREIGN PATENTS OR APPLICATIONS
1,304,484   1/1973   United Kingdom
2,109,089   9/1971   Germany Primary Examiner—William D. Martin
Assistant Examiner—William H. Schmidt
Attorney, Agent, or Firm—McGlew & Tuttle

[57] ABSTRACT

A sun protection glass comprises an absorption free base glass having a light absorbing thin vacuum vapor deposited layer comprising a mixture of a non-metallic embedding material of low absorption with a metal as an absorption substance and composed of a mixture of magnesium fluoride, chromium and silver. The layer advantageously contains from 350 to 500 parts by weight of magnesium fluoride and 75 to 100 parts by weight of chromium and 10 to 50 parts by weight of silver.

The light absorbing layer may be coated with antiflection layer.

4 Claims, 1 Drawing Figure

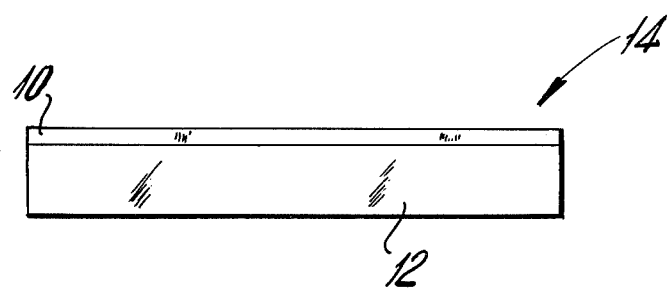

SUN PROTECTION GLASS

BACKGROUND OF THE INVENTION

1. Field of the Invention

This invention relates in general to the construction of coated glasses or lenses and in particular to a new and useful sun protection glass which comprises an absorption free ground glass having a light absorbing thin layer thereon of a mixture of a non-metallic embedding material of low absorption and a metal as an absorbing substance which the layer being formed by a vacuum vapor deposition.

2. Description of the Prior Art

Sun protection coatings are known which include low-absorbing substances of low refraction. For example, different oxides including principally $SiO_2$ (quartz), and fluorides most particularly magnesium fluoride, are employed as embedding material, and substantially all metals have been practically tested as absorbing substances. A low refractive index of the embedding material is important because the reflecting power of the layers depends on it. A most low reflectivity is desired since the mirror effect has to be avoided. This, however, was hardly avoidable in the experience heretofore when metal is embedded in the low absorption layer in the concentration necessary for an absorption of 60% (or more) of the incident light. By embedding the metal the refractive index of the layer is substantially raised. Since the two boundary surfaces of the layer — that between layer and glass and also that between layer and air — act as reflection surfaces and the interval between these two surfaces is very small, namely in the order of magnitude of the wavelengths of the light passing through there occur as is known interference phenomena which cause color effects. Since angle of the path differences between the partial wave reflected on the one boundary surface with respect to the partial wave of the incident light reflected on the other boundary surface depends also on the angle under which the light falls upon, or under which the reflection is observed, the wavelengths are amplified and also diminished by the interference and the color effect becomes dependent on the said angle and this leads, as is well known, to the fact that the spectacle glasses reflect different colors according to the movement of the user and this is perceived as a disagreeable iridescence.

Varied tests have been made to suppress the color effects due to interference. It has been tried to keep the refractive index of the layer as small as possible. This has succeeded only for relative low concentrations of the embedded absorption substance. Because of this, in many cases another approach was taken, namely it was attempted to reduce the reflection of the layer by additional so-called reflection-lowering coatings. This however requires an accurate manufacture technology, thus increasing the production costs. Besides, with reflection-lowering coatings, the whole spectrum of the visible light cannot be influenced to the same extent, because the reflection-lowering coatings cause a color effect. Even with the best anti-reflection coatings available, the reflection cannot be avoided completely, so that now as before with such sunglasses one must put up with colors due to interference.

Another known way for diminishing the interference phenomena employs so-called non-homogeneous layers, i.e. layers whose refractive index decreases gradually from the inside of the layer outwardly, vertical to the layer surface, and the index reaches a definite minimum on the outer boundary surface. By this method the absorption layer itself shows an effect similar to that of an additional reflection-lowering layer. Certain good results were attained, but the manufacturing technology for non-homogeneous layers is still more complicated and costly than for the aforementioned multiple layer coatings.

SUMMARY OF THE INVENTION

The object of the invention is to provide a coating for a light-absorbing sun protection glass which overcomes to a great extent the described disadvantages of the known devices and can be made economically. The inventive solution relies upon the use of a special mixture of embedded materials and absorption substances. It is characterized in that the layer consists of a mixture of magnesium fluoride, chromium and silver.

It has been found unexpectedly that with the simultaneous use of chromium and silver as absorption substances, a substantially smaller increase of the refractive index for a definite absorption capability is obtained, than when the same absorption has to be achieved with only one of the two metals or with another metal. Moreover, the mixture in accordance with the invention has a preferred agreeable yellowish-brown tint when viewing through it, such as is desired for sunglasses.

Accordingly it is an object of the invention to provide a sun protection device which includes an absorption free base glass and a light absorbing thin vacuum vapor deposited layer of a mixture of a non-metallic embedding material of low absorption with a metal as an absorption substance and composed of a mixture of magnesium fluoride, chromium and silver.

A further object of the invention is to provide a sun protection glass which exhibits an improved viewing color when looking therethrough.

For an understanding of the principles of the invention, reference is made to the following description of typical embodiments thereof as illustrated in the accompanying drawing.

BRIEF DESCRIPTION OF THE DRAWING

The only FIGURE of the drawing is an end elevational view of a sun protection glass constructed in accordance with the invention.

GENERAL DESCRIPTION OF PREFERRED EMBODIMENT

As an example for carrying out the method of the invention, for the manufacture of a sun protection coating of 70% absorption, in a vacuum vapor-depositing installation, a mixture consisting of 350 parts by weight magnesium fluoride, 80 parts by weight chromium and 20 parts by weight silver, was deposited as a layer 10 on a glass 12. This mixture was vaporized according to the known method of flash evaporation and deposited upon the glass surfaces in a vacuum of about $10^{-5}$ torr in a layer thickness of 0.8 $\mu$m. With a silver amount of 40 parts by weight with the same other composition, an absorption of 80% is obtained at the same layer thickness.

In accordance with first named example, sun protection glasses 14 are obtained, whose reflection, from both sides of the glass, amounted to about 4% and hardly distinguished from the reflection of an uncoated glass surface. The light amplitude reflected at the boundary surface between glass and layer becomes very small and thus also the possible amplifying or lowering of certain light wave lengths. Such a sun protection glass possesses therefore only low color effects caused by interference. In comparison to this, a coating with a mixture of 350 parts by weight $MgF_2$ and 100 parts by weight chromium which also has an absorption of 70%, results in a reflection of about 6%. Therefore the interference colors are substantially more intense with such a sun protection glass.

By changing the amount of metal in the mixture, other absorption rates can easily be achieved. With mixture containing 350 to 500 parts by weight magnesium fluoride and 75 to 100 parts by weight chromium and 10 to 50 parts by weight silver, the absorption range of about 60% can be easily exceeded up to 80%. There is in each case an optimal ratio of the amount of chromium to that of silver, which depends on the requirements in respect to the transmitted color but makes it possible to obtain a minimum refractive index for a specified layer thickness and light absorption. For this optimal ratio no formula is given for the optimal ratio but this is easily established within the indicated extent of variations, by a few preliminary tests.

For sizing the layer thickness of the absorption layers in accordance with the invention, it should be noted that a thickness of up to 1 $\mu$m is admissible in any case, without the danger of peeling off.

A further advantage of the inventive sun protection glass is that due to the low refractive index of the layer it is possible to apply a reflection-lowering layer with broad spectral effect. The minimum point of this reflection-lowering layer is advantageously placed in the blue spectral range. Such a reflection-lowering layer has then a very light interference coloring which coincides with the desired transmission color, and is consequently inconspicuous. With the known absorption layers of higher refractivity for sun protecting glass on the contrary, one must put up with substantially higher interference coloring because of which often the application of a reflection-reducing layer must be given up and where reflections of 7% or more occur.

While a specific embodiment of the invention has been shown and described in detail to illustrate the application of the principles of the invention, it will be understood that the invention may be embodied otherwise without departing from such principles.

What is claimed is:

1. A sun protection glass comprising an absorption-free base glass, and a light-absorbing thin vacuum vapor deposited layer of a mixture of a non-metallic embedding material of low absorption with metal as absorption substances composed of a mixture of magnesium fluoride, chromium and silver, said layer containing 350 to 500 parts by weight magnesium fluoride, 75 to 100 parts by weight chromium and 10 to 50 parts by weight silver.

2. A sun protection glass according to claim 1, wherein said layer contains 80 parts by weight chromium and 20 parts by weight silver.

3. A sun protection glass according to claim 1, wherein said layer contains 80 parts by weight chromium and 40 parts by weight silver.

4. A sun protection glass according to claim 1, wherein said sun protection glass has an absorption of at least 60%.

* * * * *